June 20, 1967 G. R. P. MARIE 3,326,620
LINKED WAVE TRANSMITTING SYSTEM FOR LIGHT WAVES
Filed May 13, 1963 2 Sheets-Sheet 2
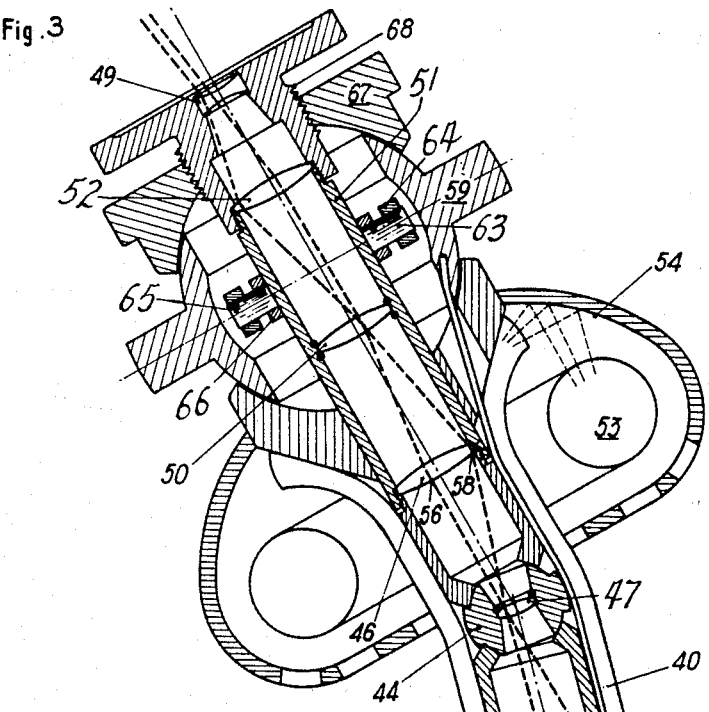
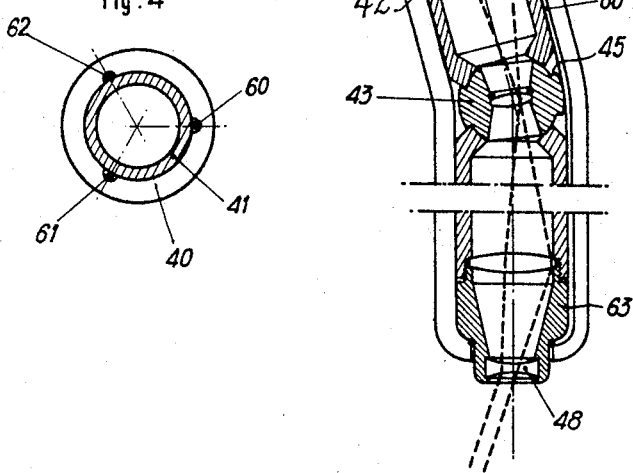
INVENTOR
GEORGES R. P. MARIE
BY
Abraham A. Saffitz
ATTORNEY United States Patent Office 3,326,620
Patented June 20, 1967

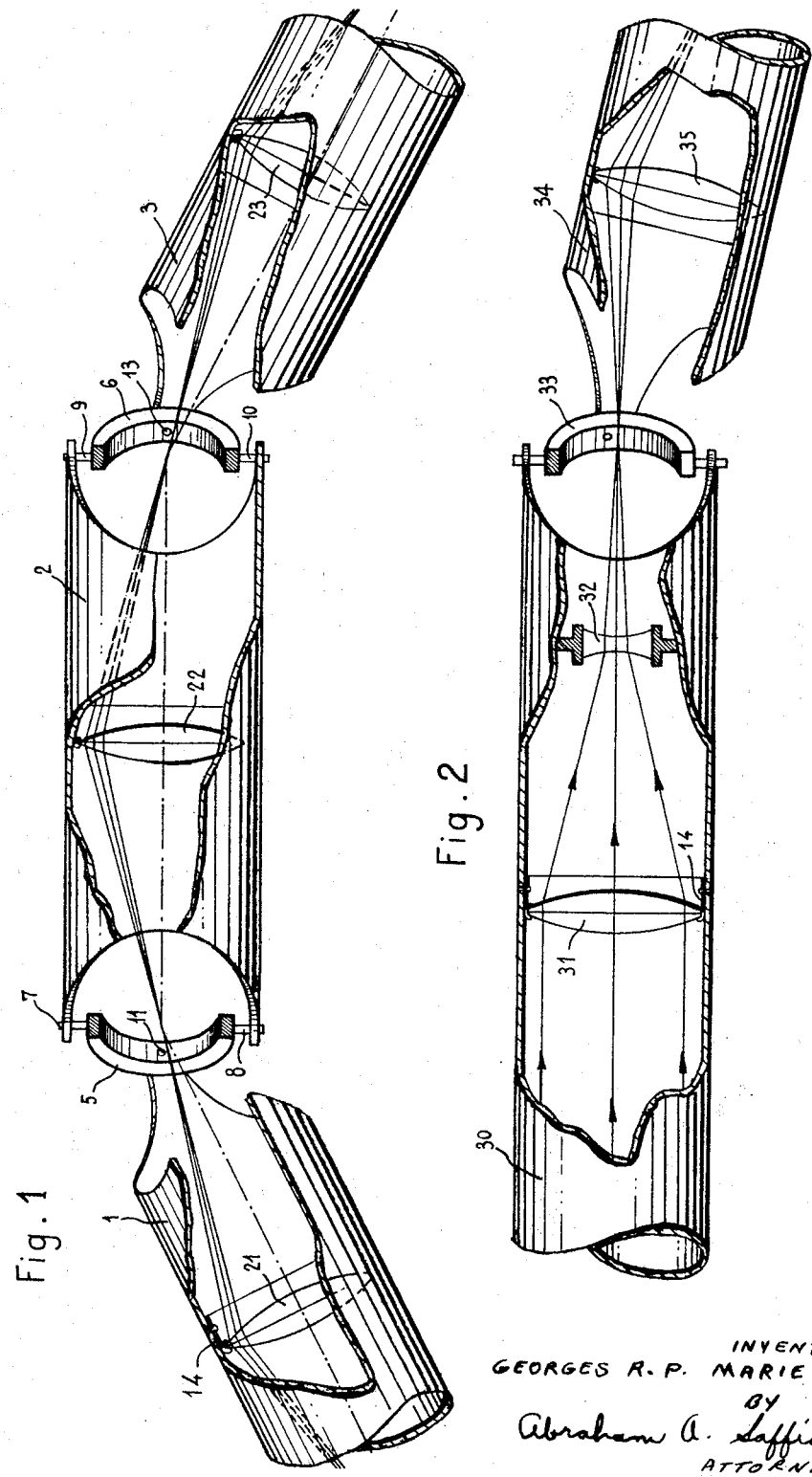

3,326,620
LINKED WAVE TRANSMITTING SYSTEM FOR LIGHT WAVES
Georges Robert Pierre Marie, 16 Rue de Varize, Paris, France
Filed May 13, 1963, Ser. No. 280,026
Claims priority, application France, May 15, 1962, 897,625; Jan. 16, 1963, 921,627
4 Claims. (Cl. 350—45)

The present invention relates to means for guiding micro- or light-waves through shape-changing non-rectilinear paths. The expression "guide" or derivatives thereof used in the process of this specification do not have the same meaning as in the conventional used expressions "wave guide" or "guided propagation," because in the new system described for the present invention propagation is carried out according to an unbounded space propagation mode.

The light-wave guiding device of the invention comprises mechanical, tube-shaped mountings which are coupled to one another through linked universal joints, such as Hooke's couplings or the like, and optical systems embodying convergent lenses made of dielectric material or glass, the lens elements being set at the mid-point of each tubular section and whose focal distance is designed at each location in order to ensure that reciprocal images are formed through the optical system which are located at the centers of the universal joints which are located at the ends of the tubular mounting section.

With such an arrangement, a light ray, for instance, crossing the center of one universal joint will meet with any other center of other universal joints in the same mounting section and, consequently, will be allowed to leave the optical device of the invention only if its path is offset with respect to one lens.

The diameter of the convergent lens should be large compared to the diameter of the incident electromagnetic or light beam which crosses the lens or lenses, for the more the beam axis is offset with respect to the center of a lens, the more the said beam is deflected.

The transmitting system of the invention is suitable for applications in two general cases, e.g. in microwave telecommunication and in the field of surgical endoscopy. It can be used in the field of microwave telecommunication to guide microwave beam electromagnetic energy from a source to a load in a curvi-linear path. It can also be used in the field of endoscopy to guide a light beam along a curvilinear path in order to allow the observation of an object located at one end by an observer who is at the other end of the device. In the first case, the angular field of the electromagnetic or light beam has no significant effect but, in the second case, the field should be sufficient to allow the sighting of the object by the observer. The gastroscopy and bronchoscopy devices are examples of the second general case; these endoscopic devices are built in the form of rigid tubings and are designed, according to the invention, in the form of short linked tubings fitted with universal joints between the links. By the use of the flexible guide of the present invention, the operation of these devices is less painful to the patient and is more efficient for the practitioner.

When the transmitting device is used in a microwave telecommunication system, the tubings act as mechanical supports of the lenses and can be relatively long, about several meters. The tubing sections can be made of metal or of an insulating material in the form of cemented fibrous tubing or of plastic material. These tubing sections act as inflexible holders but may also act if necessary as a sheath for the propagation system and provide the whole system with a protective inert leak-proof environment containing an inert gas such as dry nitrogen. To this end, the tubings are set inside of a flexible sheath, made of plastic material, which can be sunk in the same manner as conventional telephone cables used in long distance communication. Moreover, in this case now considered, each tubular section comprises only one lens at its middle point.

In order to connect a long and rectilinear tube to a linked assembly according to the invention, it is necessary to use an intermediate microwave or optical device, the latter being similar to the well-known Galilean astronomy telescope. This telescope is useful for the passage of a large section wave beam of low diffraction from a long rectilinear path to a narrower section wave beam thereby allowing a wider deflection of the said beam with a deflecting lens of the same diameter.

When a rather large optical field is required, the spherical joints between the tubular sections are made of toggle-joints which are provided with lenses mounted in diametrical planes of the toggles of the joints; these lenses being named hereinafter "secondary lenses" as opposed to the lenses which are mounted inside of the tubular sections which are named "main lenses."

An elastic wall, in the form of a sheath, holds the tubes in position and the tubes support the main lenses and the toggles which bear the secondary lenses against each other. Moreover, this flexible wall can be transparent and coated both on the outside and on the inside with reflecting layers suitable for the guidance of the light from an external source toward the sighted point, as in the case of gastroscopic devices of the prior art.

If the device is used to guide an electromagnetic energy beam from a source along a curvilinear path, the object and the successive images at the centers of the successive toggles are almost punctual so that the secondary lenses are theoretically useless; but, in actual practice the successive images must have a significant area in the toggles median planes so that the setting of secondary lenses in these median planes is important. The secondary lenses do not affect the quality of the images since a thin lens does not modify a real image located in its plane but deflects the general direction of the light beam in order to reduce losses to a minimum. In other words, a secondary lens set between two main lenses assures the passage through the second main lens of the greatest possible number of rays issuing from the first main lens. To accomplish this condensing function, it is necessary that the two adjacent main lenses should be in planes which are reciprocal images of each other through the secondary lens separating them. It therefore follows that the secondary and main lenses have the same focal length.

In the application to gastroscopy or bronchscopy, the bending of the apparatus is controlled by three wires inserted between the metallic pipes which hold the main lenses and the flexible sheath. The device movement is controlled by the pull exerted on the said wires. The wires extend through an apertured toggle joint member connected between the last guiding tube of the articulated tube device and a terminal member carrying an eyepiece. The joint member can be set in an arbitrary direction with respect to the last guiding tube. By varying this direction, the operator exerts different pull on the three wires which are fastened to the joint member at the same distance from its center and which are spaced apart from one another by an angle of $2\pi/3$.

The invention will be now disclosed in detail in connection with the accompanying drawings in which:

FIG. 1 shows a tubng assembly able to be bent into a curve for the guidance of microwave electromagnetic energy and made of tubular members linked according to the invention, a part of the surface of the tubes being exploded;

FIG. 2 shows the transition member inserted between a single long tubular member and the flexible tubular assembly according to the invention;

FIG. 3 is a cross-sectional view of the device used for the guidance of light waves, through a plane going through the tubes axes; and FIG. 4 is a cross-sectional view on a plane at right angles to the axis of a tube.

FIG. 1 shows three tubular sections 1, 2, 3 forming a linked system based upon the universal or spherical joints 5 and 6 which are set at both ends of section 2.

The spherical joint is made of a metal gimbal 5 provided on its periphery with two pins 7 and 8, set in the direction of a diameter of gimbal 5. The ends of these pins are located in holes bored in the wall of tube 2. On the diameter at right-angle to the diameter coincident with the axis of pins 7 and 8, the gimbal 5 is provided with two other pins; one pin 11 is shown in FIG. 1 and the other, in a symmetrical position with respect to the center of gimbal 5, is not shown in this figure. The two latter pins are also located inside of holes bored in the wall of tube 1. The pins 9, 10, 13 and the one not shown in FIG. 1, are set along the directions of two diameters at right-angle of gimbal 6, and constitute the linked assembly connecting tube 3 to tube 2.

In this way, it is possible to pivotally connect in series a large number of tubular members.

Lenses 21, 22, 23 are set respectively at the middle of each tubular member, through mounting-rings, such as mounting-ring 14. During every possible moving of the linked assembly, the center of a spherical joint stays at the intersection point of the optical axes of convergent lenses 21, 22, 23. As mentioned above, these lenses can be made of dielectric material or glass, according to the nature of the guided electromagnetic waves.

Let $a$ be the distance between the center of gimbals 5 and 6 of the Hooke's joints, respectively located at the ends of tube 2; it is necessary that lens 22, at the middle of tube 2, should have a focal distance $f=a/4$. Thus, each center of both gimbals 5 and 6 is located at a distance $2f$ from the optical center of lens 22 and, consequently, the centers of the two gimbals 5 and 6 are reciprocal images. It follows that any light ray coming into the center of an universal joint will cross all of the centers of the other universal joints in the linked system of the invention whatever may be the setting of the tubular links of the said system, under the condition, however, that the light rays would never swerve outside of the lens.

Let D be the diameter of lens 22 and let $d$ be the diameter of the light beam when, after crossing the front face of lens 22, the beam is collimated into a parallel direction with the optical axis of said lens, which coincides with the axis of tube 2.

The maximum angle possible between the optical axis of lens 22 and the axis of the light beam which diverges towards the lens or converges away from the lens is expressed as:

$$\frac{D-d}{2}/2f \text{ radians}$$

The maximum angle made by the optical axis of two successive lenses, for instance 22 and 23, is twice as large as the latter, that is to say:

$$\varphi_{max}=D-d2/f \text{ radians}$$

Since the length of a tubular link is $a=4f$, the minimum curvature radius of the assembly is:

$$R_{min}=\frac{4f}{\varphi_{max}}=\frac{8f^2}{D-d}$$

this curvature radius $R_{min}$ being obviously the radius of the circle circumscribed about the polygon formed by the axis of the tubular stubs forming the linked system of the invention.

FIG. 2 shows the transition device allowing a light or micro-wave beam of large section propagating inside a long rectilinear tube 30, where diffraction would be negligible, to be converted into a wave beam of narrower section in order to let it pass through an assembly of linked tubular members, whose first tube 34 is only shown. In the latter, light enters in the form of a cone whose vertex opening angle $d/4f$ must have a sufficiently small value in order that the angle $\varphi_{max}$ made by the axes of two sequent tubular members should be significant.

For practical reasons, lens 31 located inside of the long tube, should have the same specifications and dimensions as lenses 21, 22 and 23 in the tubular linked system. Thus, the beam crossing the said lens 31 has a diameter nearly equal to D and consequently the convergent beam, issued from lens 31, has a vertex angle of about $D/4f$.

This vertex angle is reduced to a value of $d/4f$ by means of divergent lens 32 which, with suitable setting with respect to lens 31, will form with that lens a Galilean telescope slightly offset. With this arrangement, the light beam converges at the center of universal joint 33 connecting the long rectilinear tube 30 to the first tubular member 34 of the linked system of the invention. The guide 34, containing lens 35, is the first out of a series of linked guides, the last one being connected to a guide or long tube similar to tube 30. The transisition system is composed of a joint similar to 33 and lenses similar to 31 and 32 in the long guide. These two lenses form a transition device used to enlarge the light beams.

It should be pointed out that the intermediate device shown on FIG. 2 can be replaced, as a variant, by a transition device derived from a slightly offset astronomic telescope.

The guidance device for optical observation of non-reachable objects will now be described in connection with FIGS. 3 and 4.

The guidance system liable to be bent comprises several short metallic tubes 41, each containing a main lens 42, whose focal distance is designed so that the centers of toggles 43 and 44, linking at the ends of tube 41, are reciprocal images of each other. A single tube 41 is shown in FIG. 3 for drawing convenience, although this component is used many times in the whole device. The ends of these tubes are built for appropriate sliding on the spherical surface of the toggles. This sliding is limited by projections 45 which are circumferentially disposed about each toggle. The metallic tubes 41 and toggles 43, 44 are held in contact by means of a flexible sheath 40.

When an image of an object to be sighted has been formed at the center of a toggle, for instance toggle 43, the main lens 42 located at the middle of the metallic tube resting on this toggle gives an image at the center of toggle 44 leaning against the other end of the metallic tube, and so on. The width of the field of such a system is very small; the maximum distance between a given point in each image and the center of the corresponding toggle decreases in inverse ratio to the number of main lenses. Therefore, it is necessary to use secondary lenses located in diametrical planes of the toggles which act to deflect the beam at each bending point while not affecting the series of images through the main lenses, except for a correction not exceeding the thickness of these secondary lenses. The secondary lenses, indeed, being located at the centers of the toggles in the very plane where the images are formed, do not affect these images but deflect the light rays towards the axis, by an angle proportional to the distance between the point where a given ray crosses the image plane and the center of the lens. In order to preserve the maximum light, it is necessary that two sequent main lenses be partially reciprocal images of each other through the secondary lens separating them. Owing to the linkage of the toggle, it is not possible to rigorously satisfy this condition, but it can be sufficiently satisfied in practical use if the secondary and main lenses have the same focal distance.

If we consider the main lenses 42 and 46 of two sequent tubes and two points 56 and 57 on these lenses, which are respectively the images of the extreme edges 55 and 58 of lenses 42 and 46 through the secondary lens 47, the points 56 and 58 define the useful pupil on main lens 46; likewise, the points 57 and 55 define the useful pupil on main lens 42. Any light ray entering the pupil of lens 42 will enter the pupil of lens 46, but any ray passing outside of these pupils is lost. The pupil limits vary with the angle formed by the axes of the two sequent main lenses 42 and 46.

If this angle is kept constant, that is to say, if the small metallic tubes are arranged to form a circle or strictly speaking a regular polygon, the pupil is the same everywhere and the rays which have crossed one of these pupils will cross any others.

When the curvature of the guiding system varies, the light beam section crossing the system is fixed by the minimum pupil. When the guide comprising flexible sections of the metallic tubes is bent first in one direction and then in the opposite direction, in order to obtain an S-shaped guide, the light beam might be cut-off, if the two curvatures are too steep or reach such a value that the image of the main lens edge through the next secondary lens does reach the center of the next main lens. The value of the curve radius $R_c$ of the flexible system is then:

$$R_c = \frac{16f^2}{D}$$

where $f$ is the common focal distance of the main and secondary lenses and $D$ is the diameter of the main lenses.

In addition to the image guiding flexible optical device, as described above, the invention comprises a flexible control system.

This system comprises three wires 60, 61, 62 sliding in grooves which are cut into the plastic sheath 40, as seen clearly in the cross-sectional view of the system. One end of these wires is fastened to the farthest metallic tube 63 holding the objective 48 while the other end is fastened to a moving ring 59 which is secured to the apparatus through the spherical joint formed by intermediate ring 64, the latter being provided with four pins 65, two of which are hinged on bearings 66 of tube 51, and the other two (not shown) having their axis at right angle to the axis of the first two. This joint swivels in ring 59 and can be rotated in any direction. Ring 59 is ball-shaped and forms a ball and socket joint with the bearing in the last tube of the device. By actuating ring 59 the operator exerts different stresses on wires 60, 61, 62 and thereby controls the curvature of the flexible guide. A nut 67 can be screwed on a threaded ocular carrying terminal member to compress ring 59 against its bearing and thereby lock it in the desired position.

In addition to the above described controlling and guiding system, the apparatus of the invention also comprises accessory members which are known in the prior art such as an objective, an eye-piece and an illuminating device, etc.

Referring to FIG. 3, the objective comprises a divergent lens 48 giving, close to its focus plane, a small image of the environment at rather great distance; it is this small-dimensioned image which is to be transmitted through the main and secondary lenses of the device.

The eye-piece is made of a lens 49 or a lens assembly designed for any easy observation of the image issued from the last main lens.

For mounting convenience, the last tube 51 is significantly longer than the standard tubes, such as tube 41, which constitute the flexible guide. In fact, one link has been omitted in the mechanical system but, from an optical point of view, the lens 50 would be located in a toggle if the latter had not been omitted and would be a secondary lens set between the main lenses 46 and 52.

The illuminating device, which need not be specifically shown, can be made of a ring-shaped bulb 53 whose rays are reflected and concentrated through mirror 54 inside of the transparent plastic sheath 40 and whose reflecting walls guide the light up to the objective region. By this illuminating arrangement, the apparatus is designed to allow observations which would be very difficult, if not impossible, with any other apparatus.

If the optical system invention is used for the guidance of a telecommunication microwave beam, the secondary lenses at the centers of the toggle joints, even though theoretically useless for no field width is required, are practically very useful because these lenses reduce the energy losses due to the centering errors of the main lens with respect to the line connecting two sequential universal joints.

What I claim is:

1. A wave energy guiding device adapted for microwave telecommunication and endoscopy along a non-rectilinear path comprising: a plurality of tubular mounting sections; apertured universal joints connecting adjacent tubular sections to each other and adapting the assembled sections to be manipulated into a curvilinear wave-guiding path; said tubular sections each mounting a primary convergent lens therewithin at a middle location thereof; said universal joints each mounting a secondary convergent lens therewithin at the center thereof; said primary lens having a focal length $f$ related to the length of the mounting section $a$ which is expressed by the equation $f = a/4$ and having a diameter $D$ which relates to the diameter of the incident light beam $d$ to create a maximum angle between the optic axis of said primary lens and the axis of the incident light beam, which is expressed as $$\frac{(D-d)}{2f}$$

for each said primary lens mounted in said tubular section, and to provide a minimum radius of curvature for the curvilinear path defined by the tubular sections of $8f^2/D - d$; and said secondary lens facilitating the observation of an object located at one end of said device by an observer who is stationed at the other end of said device.

2. A device as claimed in claim 1 which is adapted for gastroscopy and bronchoscopy wherein each of said tubular sections are formed of metal and wherein said universal joint is also formed of metal and comprises a gimbal fitted with mounting pins which engage corresponding holes near the wall end of the tubular mounting section; said gimbal being further provided with a recess adapting angular movement of an adjacent tubular section fitting into said gimbal.

3. A device as claimed in claim 1, including a common sheath which surrounds said tubular sections in mounted assembly with said universal joint; said sheath being provided with a plurality of grooves along the length thereof and being fitted with wire which are guided in said groves; one end of the wires being fastened to the front end of the device and the other end of the wires being adapted for hand manipulation and pulling to control the shape of the curvilinear path as desired.

4. A device as claimed in claim 1, including means for collecting the wave energy received at the observer's end of the device.

References Cited

UNITED STATES PATENTS

| 984,929 | 2/1911 | Kellner. | |
|---|---|---|---|
| 2,453,862 | 11/1948 | Salisbury | 128—9 |
| 3,190,286 | 6/1965 | Stokes | 128—6 |

OTHER REFERENCES

German application No. 1,117,256, Brachvogel et al., Nov. 16, 1961.

JEWELL H. PEDERSEN, *Primary Examiner.*

JOHN K. CORBIN, *Examiner.*